Hosterman

[15] 3,637,309
[45] Jan. 25, 1972

[54] NONCONTACT APPARATUS TO DETERMINE REFERENCE INFORMATION

[72] Inventor: Harry L. Hosterman, 1146 Meadow Spur, Akron, Ohio 44313
[22] Filed: Mar. 25, 1969
[21] Appl. No.: 810,252

[52] U.S. Cl. ..................356/172, 250/228, 250/236, 356/236
[51] Int. Cl. ........................G01b 11/27, G01j 1/04
[58] Field of Search ..................356/152, 172, 236; 250/236, 250/228

[56] References Cited

UNITED STATES PATENTS

| | | | |
|---|---|---|---|
| 2,703,505 | 3/1955 | Senn | 356/172 |
| 2,819,645 | 1/1958 | Koulikovitch | 356/172 |
| 3,016,464 | 1/1962 | Bailey | 250/219 TH |
| 3,229,099 | 1/1966 | Schwinghamer et al. | 356/172 |
| 3,364,356 | 1/1968 | Jones | 250/236 |
| 3,439,170 | 4/1969 | Zagone et al. | 250/203 |

FOREIGN PATENTS OR APPLICATIONS 791,778  3/1958  Great Britain ..........................356/167

OTHER PUBLICATIONS

K. Skutley, Precision Alignment Systems, Civil Engineering, Sept. 1967, pp. 44–45.

Primary Examiner—Ronald L. Wibert
Assistant Examiner—J. Rothenberg
Attorney—Oldham & Oldham

[57] ABSTRACT

This apparatus utilizes a fixed laser beam as a reference to determine offset error on a movable platform of a layout machine with reference to a fixed frame carrying the movable platform. Essentially, the invention provides at least two photocells mounted on the movable platform with appropriate optical equipment to receive the laser beam and give equal signal readout when the movable platform is in predetermined offset relationship with the laser beam, indicating a zero position with respect to the reference established by the laser beam. When the movable platform because of inherent mechanical defects in the stationary platform upon the movement thereof relative to the stationary platform actually moves out of alignment with respect to the laser beam, the photocells detect varying amounts of light proportional to the offset relationship of the movable platform, and this is converted to displacement in terms of measurement for use in correcting measurements or other position information taken by apparatus located on the movable platform.

3 Claims, 8 Drawing Figures

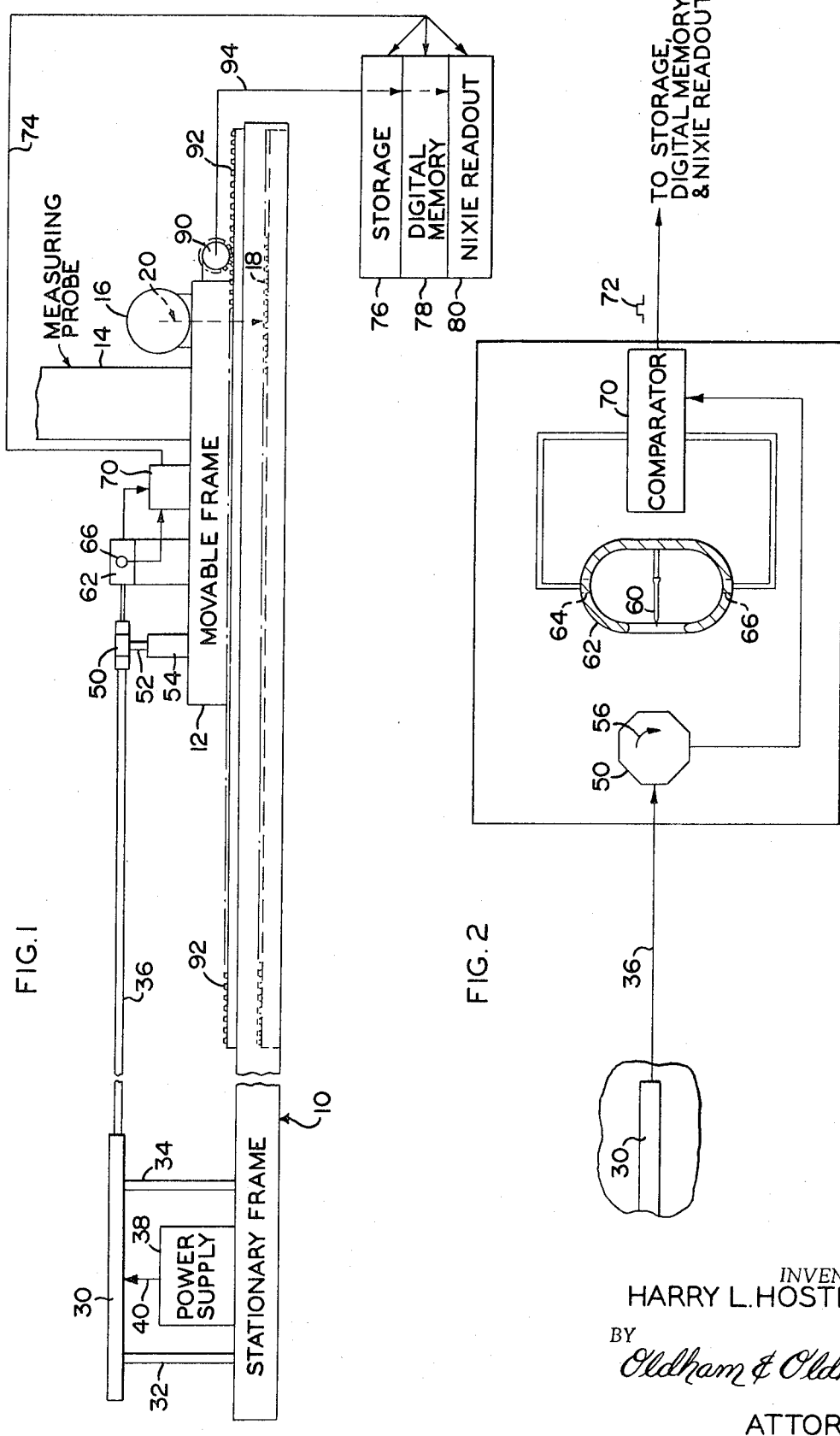

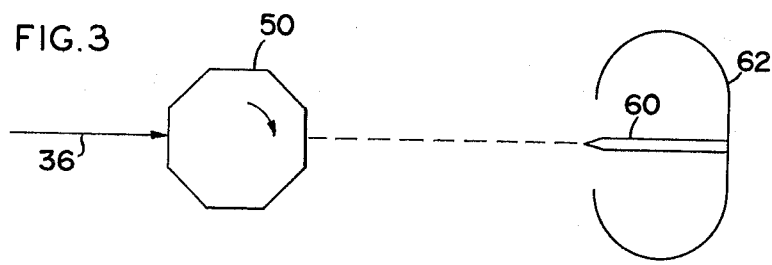
FIG. 3
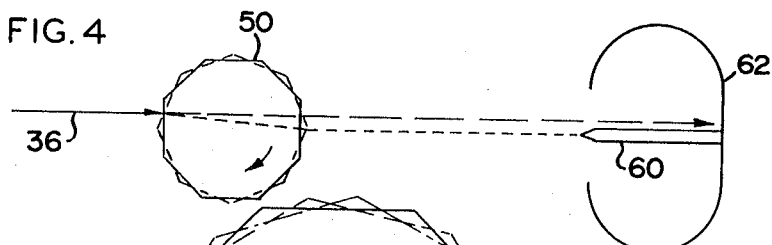
FIG. 4
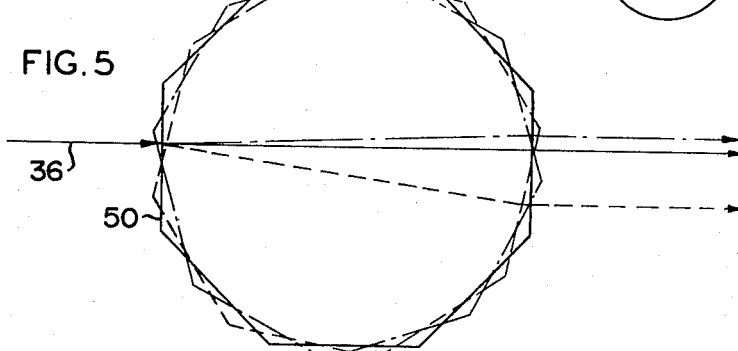
FIG. 5
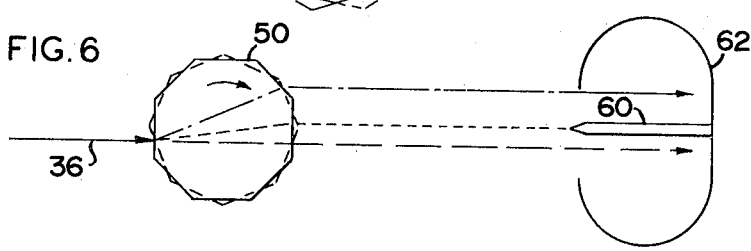
FIG. 6
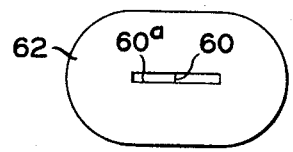
FIG. 6A
FIG. 7
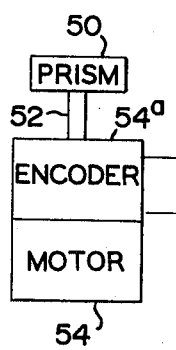
INVENTOR.
HARRY L. HOSTERMAN
BY
Oldham & Oldham
ATTORNEYS.

NONCONTACT APPARATUS TO DETERMINE REFERENCE INFORMATION

Heretofore, it has been well known that inspection and layout apparatus are utilized in precision machinery and other fabricating and development concepts to lay out designs for two-dimensional or three-dimensional objects, or measure final designs of two-dimensional or three-dimensional objects to inspect duplication with respect to the original. However, it is becoming increasing important for such layout inspection apparatus to have great precision to such tolerances as 0.001 to 0.0001 of an inch. Heretofore, inspection and layout devices to achieve this kind of precision have been extremely expensive. This expense is involved in the preparation of the bed and a movable platform for the bed where the tolerance of movement between the platform and the bed is precise and exact. However, regardless of how precise the machining between the bed and the movable platform in a large layout device, there is bound to be some lateral or vertical offset error present when the movable platform moves longitudinally with respect to the bed. Hence, some reference fixedly mounted to the bed which is independent of any errors in machining between the movable platform and the bed is necessary to meet the tolerance requirements in this field.

Therefore, it is the general object of the invention to provide a reference apparatus particularly designed for layout equipment which utilizes a laser beam as a reference, and measures the displacement of the movable platform with respect to the laser beam.

A further object of the invention is to provide apparatus to detect displacement with respect to a reference of a movable member with respect to a fixed member which utilizes a laser beam, and which measures offset displacement from the laser beam by directing the beam onto a knife edge and measuring that portion of the beam that falls on each side of the knife edge.

These and other objects of the invention which will become clearer as the description proceeds and are achieved by providing apparatus to measure offset displacement from a reference of a movable member which comprises a stationary-mounted coherent light beam source which is mounted to direct the beam towards the movable member, a pair of photocells mounted on the movable member arranged to detect equal amounts of radiation from the laser beam when the movable member is at a predetermined position, but to detect varying proportional amounts of light when the movable member is to one side or the other of such predetermined position, and means to measure and compare the outputs from the photocells to determine the position of the movable member with reference to the laser beam.

For a better understanding of the invention reference should be had to the accompanying drawings wherein:

FIG. 1 is a schematic elevational view of the reference apparatus of the invention associated with a conventional layout device;

FIG. 2 is a plan view of the laser beam and the measuring apparatus mounted on the movable platform comprising the preferred embodiment of the invention;

FIG. 3 is a schematic illustration of the rotating prism with respect to the laser detector in the zero or null position;

FIG. 4 is a schematic illustration similar to FIG. 3 but showing the result of the laser beam having moved with respect to the detector to one side;

FIG. 5 is an enlarged view of a portion of the prism of FIG. 4 showing more clearly the angular configuration of the faces and the beam to achieve the translation desired;

FIG. 6 is a schematic illustration of the laser beam having moved with reference to the detector to the other side;

FIG. 6a is a front elevational view of the detector; and

FIG. 7 is a schematic block diagram of the relationship and flow of electrical information according to the preferred embodiment of the invention.

With reference to the form of the invention illustrated in FIG. 1 of the drawings, the numeral 10 illustrates generally a stationary base frame of a layout device, which also includes a movable frame 12, and a measuring probe mounted to the movable frame 12. The frame 12 is movable normally in only one direction with respect to the frame 10 by means of a drive motor 16, in this case indicated as driving with a rack 18 mounted to frame 10, through an appropriate gear train, or the like as schematically indicated by dotted line 20. It should be understood that the invention is not concerned with the specific structural aspects of the layout device, but is concerned with maintaining a reference between a movable member and a fixed member where even through a finely machined guiding groove might be maintained between such movable member and such fixed member, displacements over long distances readily occur, and tolerances to within 0.001 inches to 0.0001 inches are not possible.

The measuring probe 14 can be one of several types, but is primarily concerned with gathering data either by optical manual readout, or by electrical automatic readout for purposes of duplicating the object being measured, or checking to see whether the object being measured meets certain predetermined dimensional criteria. Such layout devices are made by the Portage Machine Co. of Akron, Ohio, 44308.

The essence of the invention is achieved by mounting a housing 30 in fixed relation by supports 32 and 34 to the stationary frame 10. The housing 30 contains apparatus to produce a laser beam 36 when properly energized by a power supply 38, which supplies power over line 40. Again, the invention is not concerned with the specific structure of the apparatus necessary to achieve the laser beam 36, but merely desires that the beam be one that will project between about 2 feet to about 200 feet accurately and with very little angular dispersion. In the preferable embodiment of the invention, the beam will be utilized for measurements between 5 feet to about 20 feet, and the beam diameter should be about 0.060 inches to 0.080 inches, although larger beam diameters may work well, also. It should be understood that the laser beam 36 provides a reference that is fixed with relation to the stationary frame 10, and does not vary in this position when properly energized by the power supply 38.

Hence, the problem is to provide apparatus mounted on the movable frame 12 which detects the laser beam 36 and measures precisely any lateral or vertical displacement that the movable frame 12 may take with respect to the beam 36. This is accomplished by utilizing a multisided prism 50 mounted in rotatable but fixed relationship to the movable frame by shaft 52 to a motor-encoder 54. Preferably, the invention contemplates that the prism 50 will be octagonally shaped to provide eight equal sides, but the number of sides may vary between about four to about 24 sides. The prism 50 will be rotated at a very high speed in a direction indicated by arrow 56 in FIG. 2. The motor-encoder 54 will normally rotate at between about 2,000 to about 15,000 r.p.m., and preferably in the vicinity of about 10,000 r.p.m. It should be understood that the prism 50 translates the laser beam 36 in a parallel moving path, as is indicated in FIGS. 3–5, and described below. The translation is directly related to the angular rotation of the prism 50, and each face thereof effects a separate translation and measurement capability.

The translating laser beam emerging from the opposite side of the prism 50 passes across a beam splitter or knife edge 60 centrally mounted inside an integrating sphere 62. The sphere 62, well known to those skilled in the optical art, is that type of device which tends to have a uniformly illuminated surface regardless of where the point of light or other radiated energy falls within the sphere. A flat white lambertian reflector paint will meet the desired objects of uniform illumination. The beam splitter 60 actually divides the sphere 62 into equal halves, and the beams from prism 50 then fall in either half of the sphere 62, dependent upon which side of the splitter 60 they hit. The beams actually enter through a small rectangular slit 60a on the front thereof, as best shown in FIG. 6a of the drawings. The invention contemplates that any sharp-edged structure would meet the objects of the beam splitter 60, although it has been found that a solid razor blade seems to function quite satisfactorily.

The sphere 62 has the property that light impinging on any surface thereof will provide illumination of equal intensity around the entire inner surface, except of course the beam splitter 60 divides the inside surface in half. In order to measure the amount of radiation present in each half of the sphere 62, the invention positions suitable photocells 64 and 66 about centrally of each half of the sphere 62, facing toward the splitter 60 as is most clearly shown in FIG. 2 of the drawings. The photocells 64 and 66 will preferably be of a type that will compatibly receive the type of radiation emitting from the laser beam 36.

The electrical flow of information is illustrated in FIG. 7 of the drawings which shows that the photocells 64 and 66 send their signals to a comparator 70. The comparator produces an output pulse every time the input pulses from the photocells are equal in magnitude. The comparator 70 is a conventional unit available through many companies to achieve this functional purpose. The pulsed output from the comparator 70 is sent to a counter 100 which is driven by counting pulses 102 from the encoder section 54a of the motor-encoder 54. The counting pulses 102 from the encoder 54a can be of any number per unit of rotation of the prism 50, and the invention contemplates that one pulse will be sent for what would be represented as 0.0001 inch of movement of the laser beam passing through the prism 50. The encoder 54a also puts out a second distinct pulse called a reference set indicated by numeral 104. This pulse 104 selected for the particular characteristics of the system with which the encoder 54a will be utilized, simply zeros the counter 100 at predetermined intervals. With the system described, the reference set 104 will actually reset the counter 100 at the beginning of each new face of revolution of prism 50, or approximately every 45° of rotation. Again, the encoder 54a and the counter 100 are well-known electronic components in the art, and coordinating in the manner described is well within the skill of one in this art.

The invention contemplates that the counter 100 will preferably start counting at −0.150 inches on the initiation from each reference set pulse 104, and that the characteristics of the system will be set so that for each 45° rotation of prism 50, the counter will count through approximately 0.300 of an inch from −0.150 inches to +0.150 inches. Hence, if the signal from the comparator 70 occurs at substantially the midway rotation of each face of the prism 50, the pulse out of the counter 100 to a Nixie readout 80, which indicates the thousandths of an inch at which the comparison pulse is received, will be recorded on a Nixie readout 80, all in a manner well understood by those in the art. Hence, if the laser beam 36 is exactly aligned with the knife edge divider 60, the Nixie readout will read 0.000 thousandths inches. In a manner also well understood by those skilled in the art, the reference information from counter 100 can also be selectively sent to a digital memory 78, or a logic mechanism and storage 76. This same logical sequence is illustrated in FIG. 1 of the drawings.

It should also be understood that if a mirror system would replace the prism 50, an angular rotation of the laser beam across the opening into the sphere 62 would occur. It would then be a simple matter to determine at what angle from coincidence with the laser beam 36, equal radiation signals occur on the phototubes 64 and 66, and because the distance from a mirror to the sphere 62 would be know, this could easily be converted into actual distance so that a rotation of the laser beam by a mirror surface rather than the parallel translation by the prism could also meet the objects of the invention.

Automatic readout of the longitudinal position of the movable frame 12 with respect to the stationary frame 10 can be by a servo counter 90 connected directly to the movable frame 12 and operating in conjunction with a stationary rack 92 connected to the stationary frame 10. The counter 90 sends its signal over line 94 to the storage 76 and or digital memory and Nixie readout 78 and 80, respectively.

For a better understanding of how the laser beam 36 reacts with the prism 50 to provide the lateral displacement information, reference should be had to FIGS. 3 through 6. Specifically, FIG. 3 illustrates the laser beam 36 in direct alignment with the beam divider 60 so that equal amounts of radiation are seen by both phototube 64 and 66 when the prism 50 is in the exactly normal relationship indicated in FIG. 3.

However, in the instance shown in FIG. 4, the prism 50 has been displaced downwardly with respect to the laser beam 36 so that at the position of the prism indicated by the solid lines, equal amounts of light do not fall on both sides of the beam splitter 60 when the prism face is normal to the beam, but the beam goes straight through the prism 50 to fall entirely on the left side of the sphere. As the prism rotates clockwise in the direction of the arrow, the beam translates to the right in parallel relation to the input beam 36, so that when the prism has rotated to the dotted line position, the beam has translated to the dotted line position where equal amounts of light are seen on both halves of the sphere 62. If the reference set pulse 104 were set to commence measurement at −0.150 inches when the respective face of the prism is just beginning to come into the beam so that the normal relation of the face would indicate 0.000 inches, the example of FIG. 4 indicates that the prism is nearing the +150-inch relation when it hits the dotted line position of beam alignment with the divider 60.

FIG. 5 illustrates in a greatly enlarge view the relation of the face of the prism and the deflection of the beam therethrough for three respective angular conditions which correspond to the showing of FIG. 4.

FIG. 6 illustrates the opposite configuration of FIG. 4 with the prism 50 having been moved to the opposite position with respect to laser beam 36 providing that the direct passage of the beam when the prism face is normal will pass to the right side of divider 60. In this instance, it is before the respective face of the prism comes normal to the beam that the translating beam hits the divider 60 to give equal illumination of both sides of the sphere 62, which is illustrated by the dotted line. This will occur between −0.150 to 0.000 inches indicating that the prism 50 has moved to the left with respect to the laser beam. The chain dotted line of FIG. 6 illustrates the extreme left edge of the point where the first edge of the respective face receives the beam.

These measurements described above are taking place eight times for each rotation of the prism. Thus, they are fast and in a repeated manner to insure that an extremely accurate reading within up to 0.0001 of an inch will always be present, thus providing extremely fine accuracy to the layout or inspection equipment that is equipped with such reference apparatus.

Naturally, the sphere and beam divider will only measure lateral offset of the laser beam with respect thereto. However, the invention contemplates that the divider could take a perpendicular cross shape with photocells in each quadrant to measure illumination therein, and this type of measurement would provide vertical and lateral offset information. Also, a duplicate system of prism, sphere and photocells as described above could cooperate with the laser beam 36 divided into two separate beams, with the prism and sphere arranged in the vertical plane to provide vertical offset information.

Thus, it is seen that the objects of the invention have been achieved by providing a laser beam reference with the laser beam mounted to a fixed portion of the measuring apparatus, and the beam being measured by phototube pickups on the movable portion of the apparatus, which directly indicate lateral offset of the movable portion of the apparatus with respect to the reference established by the laser beam.

While in accordance with the patent statutes only the best known embodiment of the invention has been illustrated and described in detail, it is to be particularly understood that the invention is not limited thereto or thereby, but that the inventing scope is defined in the appended claims.

What is claimed is:

1. Apparatus to measure lateral displacement from a reference of a movable member which comprises a stationary mounted radiating beam source which is mounted to direct a confined coherent reference light beam towards the movable member, a light-integrating sphere mounted on said movable member having a narrow elongated slit therein to receive the beam, a flat beam divider having a sharp edge mounted in the sphere to effectively divide the sphere into two equal parts, and where the divider is positioned substantially perpendicular to and at the midpoint of the elongated length of the slit, photocells mounted on each side of the beam divider in the integrating sphere, means positioned between said source and said integrating sphere to move the beam in a reciprocating linear path substantially coincident with the slit and along the full length thereof in a predetermined manner, and means to measure and compare the outputs from the photocells and to determine the lateral position of the movable member with respect to the reference beam when the photocells detect equal amounts of radiation.

2. An apparatus according to claim 1 where the means to move the beam includes a multisided prism positioned between the beam source and the sphere, a motor-encoder designed to rotate the prism at a predetermined speed, a counter unit receiving counting pulses from the encoder and a reference set pulse from the encoder for each respective face of the prism, the counter producing continuous count from the counting pulses of the encoder before being reset by each reference set pulse therefrom, a comparator receiving the electrical signals from the photocells, and producing a compare pulse every time the signals are equal, with the compare pulse being sent to the counter, and a readout mechanism actuated by the counter to indicate that point in the count at which the counter is actuated by the pulse from the comparator.

3. Apparatus according to claim 2 where the prism has eight sides, and the reference set pulse from the motor encoder is provided for each 45° of rotation thereof, and where the counter measures the translation of the beam in thousandths of an inch over a range of 0.300 inches.

* * * * *

UNITED STATES PATENT OFFICE
CERTIFICATE OF CORRECTION

Patent No. 3,637,309            Dated January 25, 1972

Inventor(s) Harry L. Hosterman

It is certified that error appears in the above-identified patent and that said Letters Patent are hereby corrected as shown below:

Following the title insert:

-- Assigned to Information Development Corporation, Akron, Ohio, an Ohio corporation. --

Signed and sealed this 3rd day of October 1972.

(SEAL)
Attest:

EDWARD M. FLETCHER, JR.
Attesting Officer

ROBERT GOTTSCHALK
Commissioner of Patents